(12) United States Patent
Jones et al.

(10) Patent No.: US 12,539,980 B2
(45) Date of Patent: Feb. 3, 2026

(54) ROTARY AIRCRAFT TIE-DOWN FIXTURE

(71) Applicant: Textron Innovations Inc., Providence, RI (US)

(72) Inventors: Alvin Jones, Arlington, TX (US); Vitthal Vishnuthreeth Arakeri, Bangalore (IN); Ross Cosby, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/652,076

(22) Filed: May 1, 2024

(65) Prior Publication Data

US 2025/0289588 A1    Sep. 18, 2025

(30) Foreign Application Priority Data

Mar. 18, 2024   (IN) .............................. 202421019919

(51) Int. Cl.
*B64F 1/12*           (2006.01)
(52) U.S. Cl.
CPC .................................. *B64F 1/125* (2013.01)
(58) Field of Classification Search
CPC .... B64F 1/125; B64F 1/12; B64F 5/40; B64F 5/50; B64D 45/00; B64D 47/00; B60P 7/06; B60P 7/00
See application file for complete search history.

(56) References Cited

U.S. PATENT DOCUMENTS

| | | | | |
|---|---|---|---|---|
| 5,179,968 A | * | 1/1993 | Deichmann | B64F 1/005 244/17.11 |
| 6,805,321 B2 | * | 10/2004 | Rodier | B64F 1/12 244/116 |
| 8,925,858 B2 | * | 1/2015 | Spiral | B64F 1/125 244/116 |
| 11,760,470 B2 | * | 9/2023 | Knott | B64C 27/35 416/134 A |
| 12,214,899 B1 | * | 2/2025 | Schrock | B64F 1/00 |
| 2005/0061917 A1 | * | 3/2005 | Ross | B64F 1/222 244/121 |
| 2010/0229904 A1 | * | 9/2010 | Bower | B64F 1/005 135/88.01 |

* cited by examiner

*Primary Examiner* — Medhat Badawi
*Assistant Examiner* — Vicente Rodriguez
(74) *Attorney, Agent, or Firm* — Bradley Arant Boult Cummings LLP

(57) ABSTRACT

A tie-down fixture for securing a rotary aircraft for transport. The tie-down fixture includes a central hub configured to couple with a main rotor hub of the rotary aircraft and having a keyhole formed therein, a plurality of arms extending from the central hub, and an eyelet extending from each of the plurality of arms.

20 Claims, 5 Drawing Sheets

ROTARY AIRCRAFT TIE-DOWN FIXTURE

CROSS-REFERENCE TO RELATED APPLICATIONS

This patent application incorporates by reference the entire disclosure of U.S. patent application Ser. No. 18/507,978, filed on Nov. 13, 2023.

TECHNICAL FIELD

The present disclosure relates generally to transport of rotary aircraft and more particularly, but not by way of limitation, to a tie-down fixture for transport of rotary aircraft.

BACKGROUND

This section provides background information to facilitate a better understanding of the various aspects of the disclosure. It should be understood that the statements in this section of this document are to be read in this light and not as admissions of prior art.

Shipment of rotary aircraft such as helicopters via air, land, or sea can be challenging. Securing the aircraft during transport and managing downward-force loads so as to avoid damage to landing gear and other components of the aircraft are problems that have been difficult to solve.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A tie-down fixture for securing a rotary aircraft for transport. The tie-down fixture includes a central hub configured to couple with a main rotor hub of the rotary aircraft and having a keyhole formed therein, a plurality of arms extending from the central hub, and an eyelet extending from each of the plurality of arms.

A tie-down fixture system includes a rotary aircraft comprising a main rotor hub and a tie-down fixture positioned above the center of gravity of the rotary aircraft and configured to secure the rotary aircraft during transport via the main rotor hub. The tie-down fixture includes a central hub configured to couple with the main rotor hub and a plurality of arms extending radially from the central hub. The tie-down fixture system also includes a plurality of tension-bearing elements attached to the tie-down fixture, the tension-bearing elements selected from the group consisting of straps, cables, and chains.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
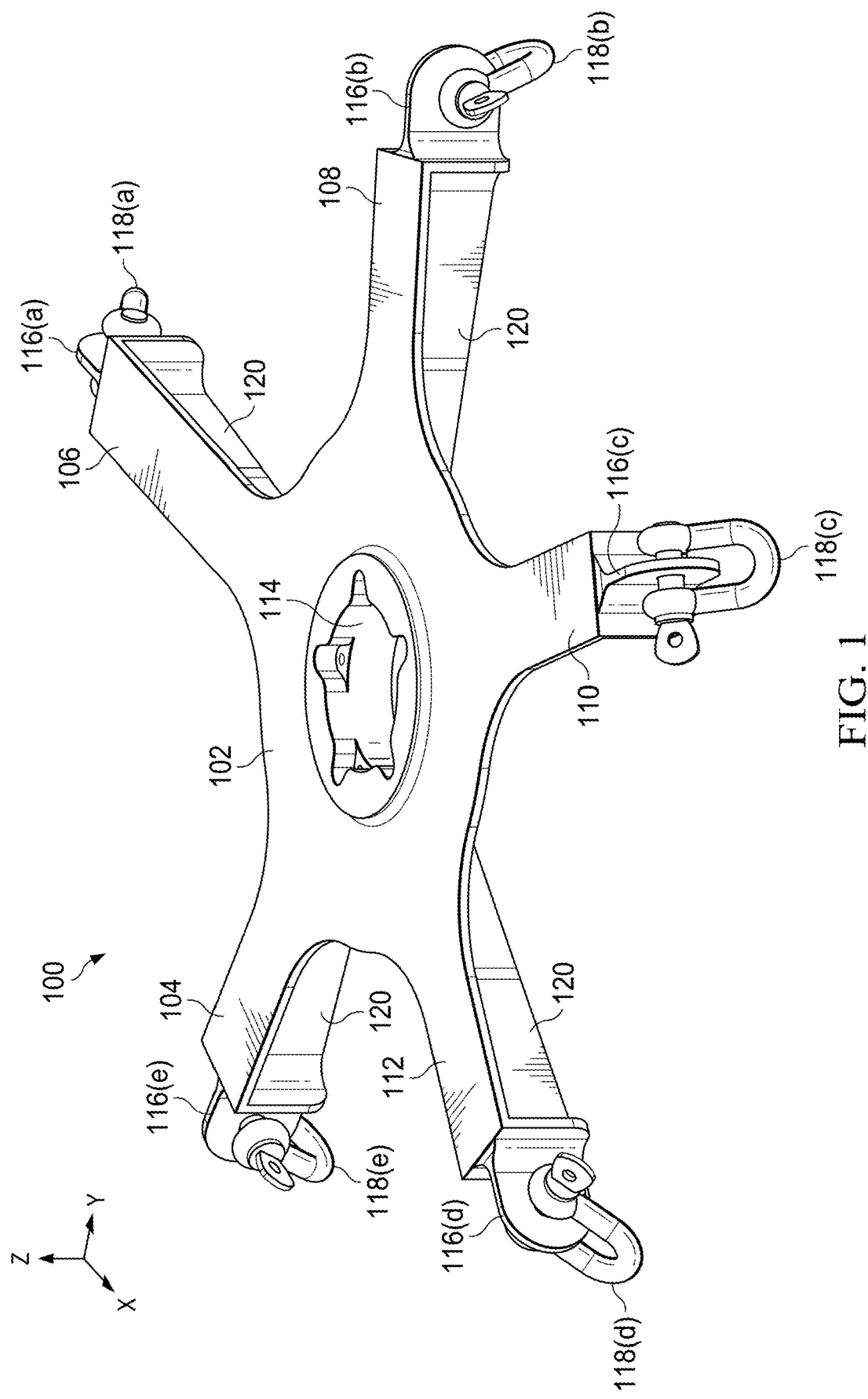
FIG. 1 is a top perspective view of a tie-down fixture.

FIG. 1 is a top perspective view of a tie-down fixture 100. The tie-down fixture 100 includes a central hub 102 with arms 104-112 extending from a periphery of the central hub 102 generally in the x-y plane. A keyhole 114 is located in the center of the central hub 102. The central hub 102 is configured to couple to a main rotor of a rotary aircraft to be transported. In a typical embodiment, the keyhole 114 is axially oriented in the z-direction relative to a main rotor hub of a rotary aircraft (not shown) to which the tie-down fixture 100 is to be mounted.

Each of the arms 104-112, respectively, has formed therein and extending from an outermost radial portion thereof in the x-y plane one of a plurality of eyelets 116(a)-(e). Each of the plurality of eyelets 116(a)-(e) has mounted thereto a respective one of a plurality of shackles 118(a)-(e), each of the plurality of shackles 118(a)-(e) including a clevis and a pin that passes through the clevis as well as through a respective one of the plurality of eyelets 116(a)-(e). Each of the arms 104-112 includes a rib 120 that extends downwardly in the z-direction relative to a top surface thereof in order to provide structural support to loads applied to the tie-down fixture 100 when in use.

In a typical implementation, the tie-down fixture 100 is locked relative to a main rotor hub of a rotary aircraft to be transported and the arms 104-112 are dimensioned and positioned so that tension-bearing elements such as straps, chains, or cables attached to the tie-down fixture 100 via, for example, the plurality of shackles 118(a)-(e) do not interfere with a main rotor hub or other portions of a rotary aircraft and still provide sufficient transfer of loads. It is advantageous that the tie-down fixture 100 is positioned above the center of gravity of the rotary aircraft. In some embodiments, the tie-down fixture 100 mounts directly to the main rotor hub, while in other embodiments a universal adapter is positioned between the main rotor hub and the tie-down fixture 100. Embodiments that do not employ a universal adapter may be advantageous in environments in which vertical clearance is limited and therefore inclusion of the universal adapter would be undesirable. The tie-down fixture 100 may include various materials including, but not necessarily limited to, steel, aluminum, or any other material that possesses an acceptable combination of desirable characteristics such as cost, strength, and durability.

Figure 2:
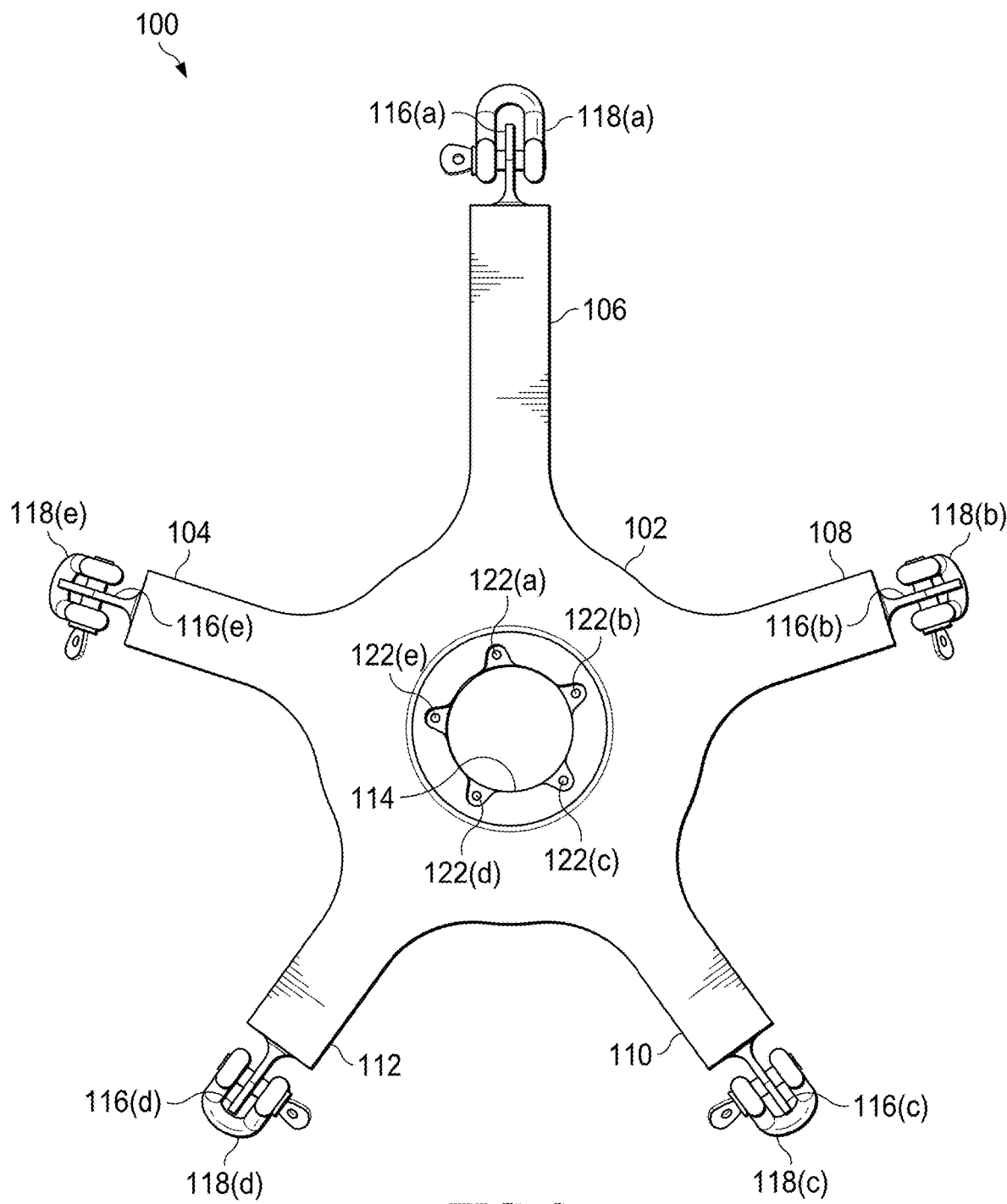
FIG. 2 is a top plan view of the tie-down fixture.

FIG. 2 is a top plan view of the tie-down fixture 100. In FIG. 2, the keyhole 114 is shown in more detail. Surrounding the keyhole 114 and evenly spaced circumferentially thereabout are a plurality of recesses 122(a)-(e). Each of the plurality of recesses 122(a)-(e) has formed therein a hole through which a screw, bolt, or other fastener may pass in order to mount the tie-down fixture 100 to a main rotor hub directly or to a universal adapter that mounts to a main rotor hub of a rotary aircraft.

Although the arms 104-112 are five in number, it will be appreciated that a different number of arms may be utilized in accordance with design considerations. Moreover, the arm 106 is longer than any of the arms 104, 108, 110, or 112; as such, various of the arms 104-112 may be of different lengths and need not necessarily be evenly spaced circumferentially about the hub 102. For example, it may be desirable to have the arm 106 be longer than any of the arms 104, 108, 110, or 112 in order to accommodate the geometry of a particular rotary aircraft to be transported such that no portions of the rotary aircraft are contacted by straps, chains, or cables attached to the tie-down fixture 100 during use.

Figure 3:
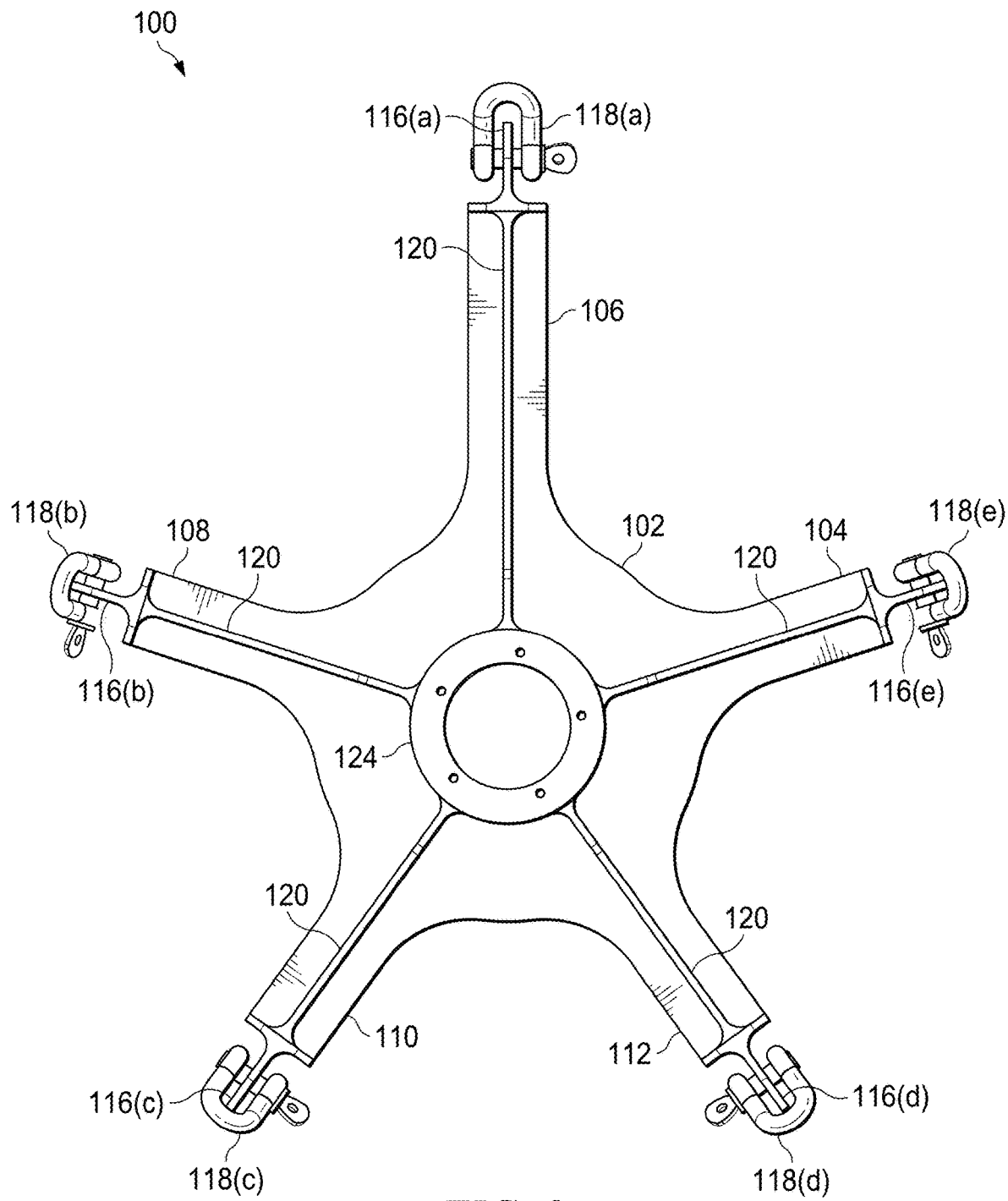
FIG. 3 is a bottom plan view of the tie-down fixture.

FIG. 3 is a bottom plan view of the tie-down fixture 100. Each of the ribs 120 originates radially at a reinforced ring 124. The reinforced ring 124 extends downwardly in the same direction as each of the ribs 120 in the z-direction as illustrated in FIG. 1. In similar fashion to each of the plurality of ribs 120, the reinforced ring 124 provides structural support so that the tie-down fixture 100 can support necessary loads during use thereof.

Figure 4:
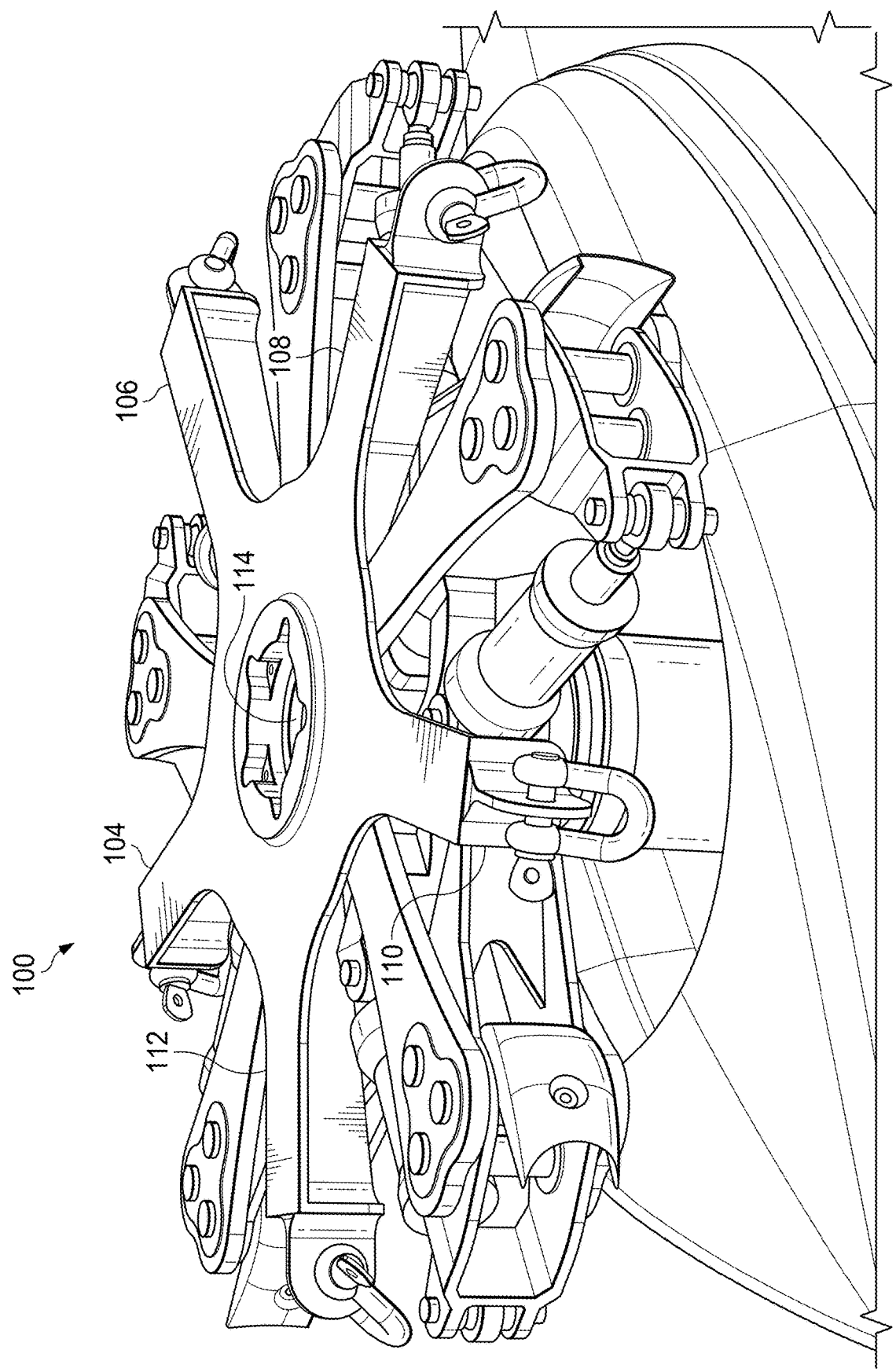
FIG. 4 is a perspective view of the tie-down fixture mounted to a main rotor hub of a rotary aircraft.

FIG. 4 is a perspective view of the tie-down fixture 100 mounted to a main rotor hub of a rotary aircraft. The keyhole 114 has fasteners in the form of bolts inserted throughs the holes formed therein in order to mount the tie-down fixture 100 to the rotor hub. As shown in FIG. 4, the arms 104-112 are arranged so as to be positioned between each of a plurality of rotor-blade grips of the rotary aircraft to which the tie-down fixture 100 is mounted. Those having skill in the art will recognize that the number of arms may be the same or different from the number of rotor-blade grips of a rotary aircraft to which the tie-down fixture is to be mounted.

Figure 5:
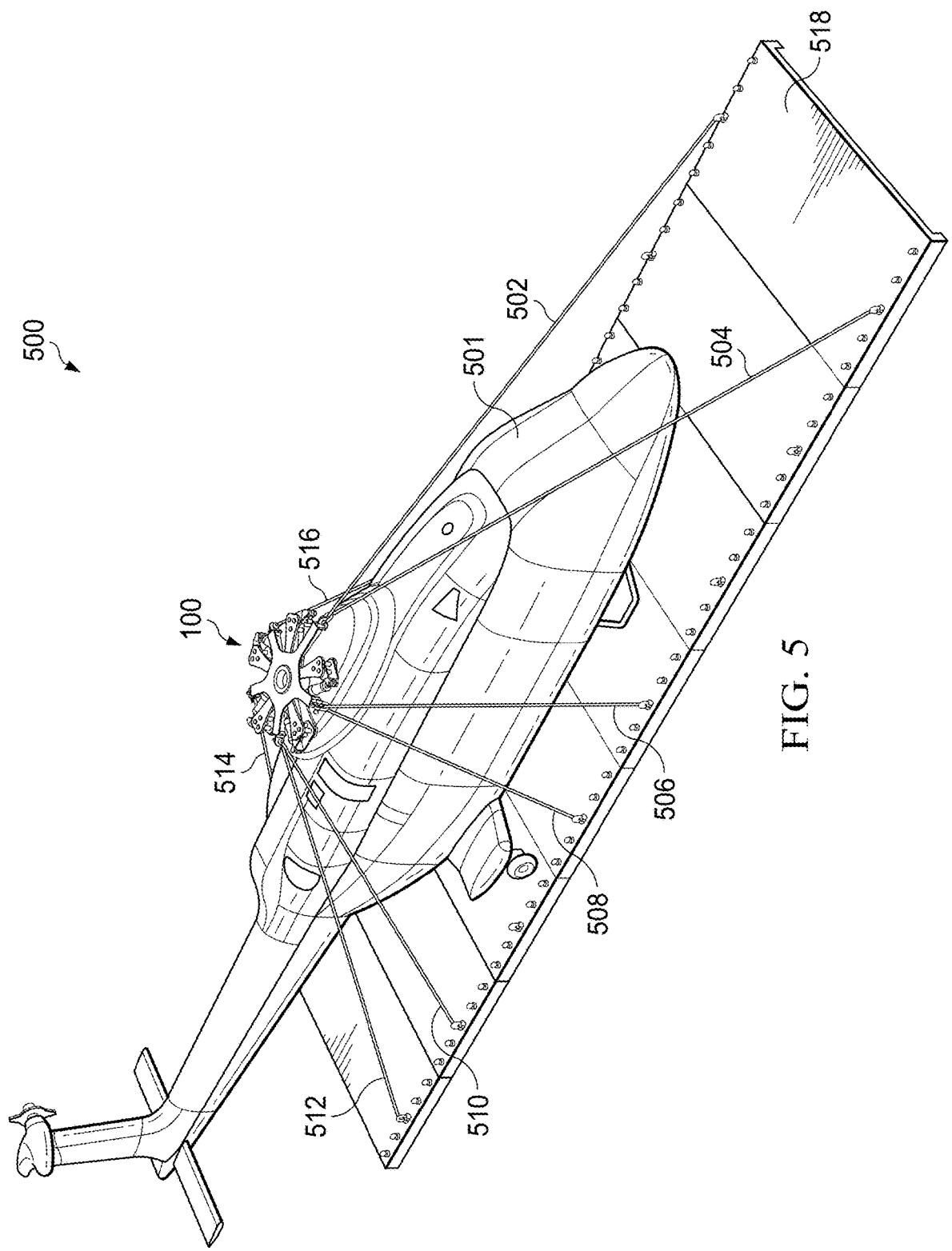
FIG. 5 is a perspective view of tie-down fixture system that includes the tie-down fixture mounted to a rotary aircraft with a plurality of mounting cables extending therefrom.

FIG. 5 is a perspective view of a tie-down fixture system 500 that includes the tie-down fixture 100 mounted to a rotary aircraft 501 with a plurality of mounting cables 502-516 extending therefrom. As illustrated in FIG. 5, the plurality of mounting cables 502-516 are connected at a first end thereof to the tie-down fixture 100 and at a second end thereof to mounting positions on a transport platform 518. The transport platform 518 may be on or part of any of an aircraft, truck, train, ship, or other transport mechanism. In other embodiments, the transport platform 518 may be replaced by an aircraft-transport skid system such as that set forth in U.S. patent application Ser. No. 18/507,978 as a medium for attachment of cables, straps, or chains to secure the rotary aircraft 501 and the aircraft-transport skid system positioned on the transport platform 518.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A tie-down fixture for securing a rotary aircraft for transport, the tie-down fixture comprising:
   a rigid central hub configured to couple with a main rotor hub of the rotary aircraft and having a keyhole formed therein;
   a plurality of arms extending from the central hub; and
   an eyelet extending from each of the plurality of arms;
   wherein each of the plurality of arms provides structure to support loads applied to the tie-down fixture to secure the rotary aircraft during transport.

2. The tie-down fixture of claim 1, comprising a shackle extending from each of the eyelets.

3. The tie-down fixture of claim 1, wherein the eyelets each have a strap, chain, or cable attached thereto for securing the rotary aircraft in transport.

4. The tie-down fixture of claim 2, wherein the shackles each have a strap, chain, or cable attached thereto for securing the rotary aircraft in transport.

5. The tie-down fixture of claim 1, wherein each of the plurality of arms comprises a rib that provides structure to support the loads applied to the tie-down fixture during transport.

6. The tie-down fixture of claim 5, wherein the rigid central hub comprises a reinforced ring that provides structural support to support the loads applied to the tie-down fixture during transport.

7. The tie-down fixture of claim 1, wherein the rigid central hub comprises a reinforced ring that provides structural support to support the loads applied to the tie-down fixture during transport.

8. The tie-down fixture of claim 1, wherein the rigid central hub has formed therein a plurality of recesses positioned circumferentially about the keyhole.

9. The tie-down fixture of claim 8, wherein each of the plurality of recesses has a hole formed therein through which a fastener may pass to mount the tie-down fixture to the main rotor hub.

10. The tie-down fixture of claim 1, wherein each of the plurality of arms is the same length.

11. The tie-down fixture of claim 1, wherein a number of the plurality of arms is the same as a number of rotor-blade grips of the rotary aircraft.

12. A tie-down fixture system comprising:
a rotary aircraft comprising a main rotor hub;
a tie-down fixture positioned above the center of gravity of the rotary aircraft and configured to secure the rotary aircraft during transport via the main rotor hub, the tie-down fixture comprising:
　a rigid central hub configured to couple with the main rotor hub; and
　a plurality of arms extending radially from the central hub; and
a plurality of tension-bearing elements attached to the tie-down fixture, the tension-bearing elements selected from the group consisting of straps, cables, and chains;
wherein each of the plurality of arms provides structure to support loads applied to the tie-down fixture to secure the rotary aircraft during transport.

13. The tie-down fixture system of claim 12, wherein none of the tension-bearing elements contacts the rotary aircraft during use of the tie-down fixture system.

14. The tie-down fixture system of claim 12, wherein each of the plurality of arms comprises a rib that provides structure to support the loads applied to the tie-down fixture during transport.

15. The tie-down fixture system of claim 14, wherein the rigid central hub comprises a reinforced ring that provides structural support to support the loads applied to the tie-down fixture during transport.

16. The tie-down fixture system of claim 12, wherein the rigid central hub comprises a reinforced ring that provides structural support to support the loads applied to the tie-down fixture during transport.

17. The tie-down fixture system of claim 12, wherein:
the rigid central hub has a keyhole formed therein formed therein; and
the keyhole has formed therein a plurality of recesses positioned circumferentially about the keyhole.

18. The tie-down fixture system of claim 17, wherein each of the plurality of recesses has a hole formed therein through which a fastener may pass to mount the tie-down fixture to the main rotor hub.

19. The tie-down fixture system of claim 12, wherein each of the plurality of arms is the same length.

20. The tie-down fixture system of claim 12, wherein a number of the plurality of arms is the same as a number of rotor-blade grips of the rotary aircraft.

* * * * *